(12) United States Patent
Mahar et al.

(10) Patent No.: US 9,286,593 B1
(45) Date of Patent: Mar. 15, 2016

(54) SYSTEM AND METHOD FOR PRODUCT DELIVERY

(71) Applicant: Humana Inc., Louisville, KY (US)

(72) Inventors: Michael Mahar, Phoenix, AZ (US); Atin Kapadia, Chandler, AZ (US); Toan Trinh, Phoenix, AZ (US)

(73) Assignee: HUMANA INC., Louisville, KY (US)

( * ) Notice: Subject to any disclaimer, the term of this patent is extended or adjusted under 35 U.S.C. 154(b) by 147 days.

(21) Appl. No.: 14/067,639

(22) Filed: Oct. 30, 2013

Related U.S. Application Data

(60) Provisional application No. 61/720,071, filed on Oct. 30, 2012.

(51) Int. Cl.
*G06F 7/00* (2006.01)
*G06Q 10/08* (2012.01)

(52) U.S. Cl.
CPC .................................. *G06Q 10/087* (2013.01)

(58) Field of Classification Search
USPC ............................................................ 700/227
See application file for complete search history.

(56) References Cited

U.S. PATENT DOCUMENTS

| | | | |
|---|---|---|---|
| 2008/0262649 A1* | 10/2008 | Allinson et al. | 700/235 |
| 2012/0073241 A1* | 3/2012 | Mahar | 53/55 |
| 2013/0105035 A1* | 5/2013 | Henriques et al. | 141/1 |

\* cited by examiner

*Primary Examiner* — Kyle Logan
(74) *Attorney, Agent, or Firm* — Standley Law Group LLP

(57) ABSTRACT

A system and method for delivering a product such as a pharmacy bottle from a conveyor system to a delivery container via a delivery chute. A control system in communication with the components of the system detects when a product is ready for release into the chute for delivery based on information obtained by a scanner on the conveyor system.

9 Claims, 1 Drawing Sheet

SYSTEM AND METHOD FOR PRODUCT DELIVERY

This application claims the benefit of U.S. Provisional Patent Application Ser. No. 61/720,071, filed on Oct. 30, 2012, titled Script Pack Bottle Chute, which is incorporated herein by reference.

BACKGROUND AND SUMMARY OF THE INVENTION

Exemplary embodiments of the present invention relate generally to a system and method for product, order or container delivery. While an exemplary embodiment may be particularly useful for transporting at least one vial order or container to a desired destination, other types of products not limited to vial orders or containers may be delivered via an exemplary system and method.

An exemplary embodiment may be particularly useful for the delivery of pharmacy orders or containers. A pharmacy vial or bottle is one example of a pharmacy order or container. Nevertheless, other types of delivery systems may also benefit from exemplary embodiments of the present invention.

In a known delivery system for pharmacy containers, the production rate and efficiency is hampered by manual operations. For example, a human operator may be required to pick a pharmacy product or container from a conveyor one at a time and then manually process it for packing. The picked product or container is then manually scanned before being added to a package (e.g., a delivery bag or box). After the package is filled in this manner, the operator then seals the package. This process is inefficient and susceptible to operator error in selecting the wrong container. Accordingly, there is a need for an improved delivery system and method that improves efficiency and production rates. A need also exists for an improved delivery system and method that minimizes operator error.

An exemplary embodiment may satisfy some or all of the aforementioned needs. An exemplary embodiment may comprise a chute in association with a conveyor. The chute is adapted to receive product from the conveyor. The chute is then adapted to transfer the product to a packing system such as a delivery bag or box. Accordingly, an exemplary embodiment may also include a packing system adapted to receive product from the chute. Another exemplary embodiment includes a related method for delivery. In an exemplary embodiment, the method comprises conveying a product on a conveyor; and transferring the product from the conveyor to a chute. The method may further comprise the step of delivering the product to a packing system via the chute. As such, an exemplary embodiment may improve efficiency and production rates and also limit or eliminate operator error.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to a system and method for delivering a product. Exemplary embodiments are particularly useful for delivering a pharmacy bottle, which may also be known as a vial. An order having multiple bottles can be delivered together via the system. The multiple bottles may be delivered in a delivery container such a bag, box or carton. However, other exemplary embodiments may be useful for delivering different types of products unless clearly set forth otherwise.

Figure 1:
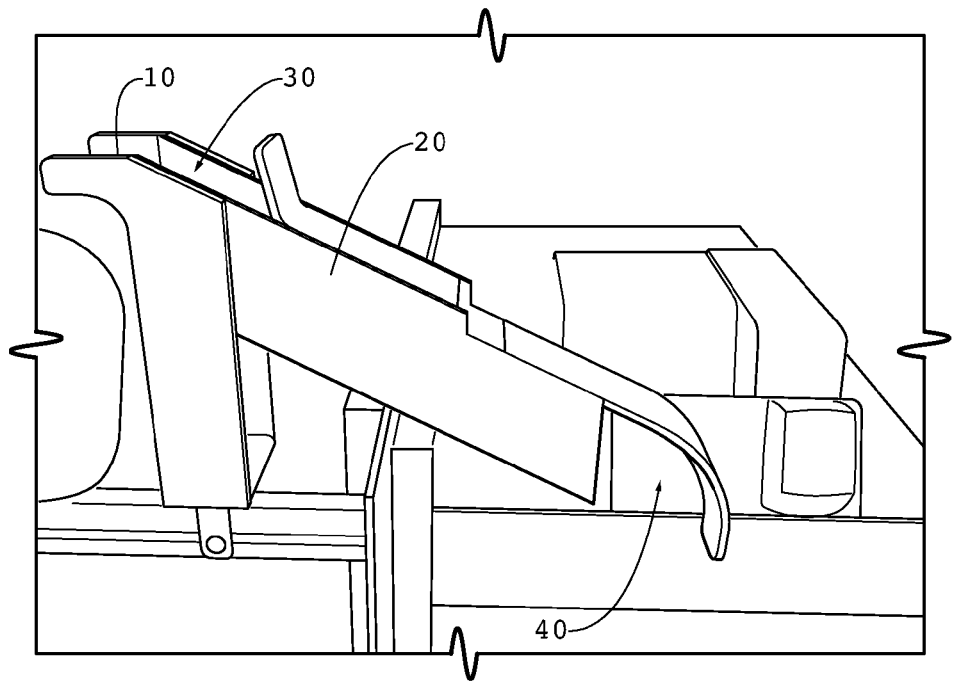
FIG. 1 is a perspective view of an exemplary embodiment of a system of the present invention.

FIG. 1 shows an example of a system for delivering a product such as a pharmacy bottle or order. In this exemplary embodiment, the system is comprised of conveyor 10 that is in association with a chute 20. Conveyor 10 is adapted to convey at least one product to the chute. The product is preferably held at the top of the chute area (e.g., held via a latch mechanism shown generally at 30) until the system is ready to release the product down the chute and into the bag (or other delivery component such as a box) below. Once the vials are released, the chute 20 is then adapted to deliver the product(s) to a bag located at the bottom 40 of the chute.

In an exemplary embodiment, chute 20 is substantially perpendicularly connected to conveyor 10. In other words, the direction of travel of conveyor 10 is substantially perpendicular to the direction of travel of chute 20 in such embodiments. In other embodiments, chute 20 may be connected to conveyor 10 at any suitable angle and in any suitable manner.

Figure 2:
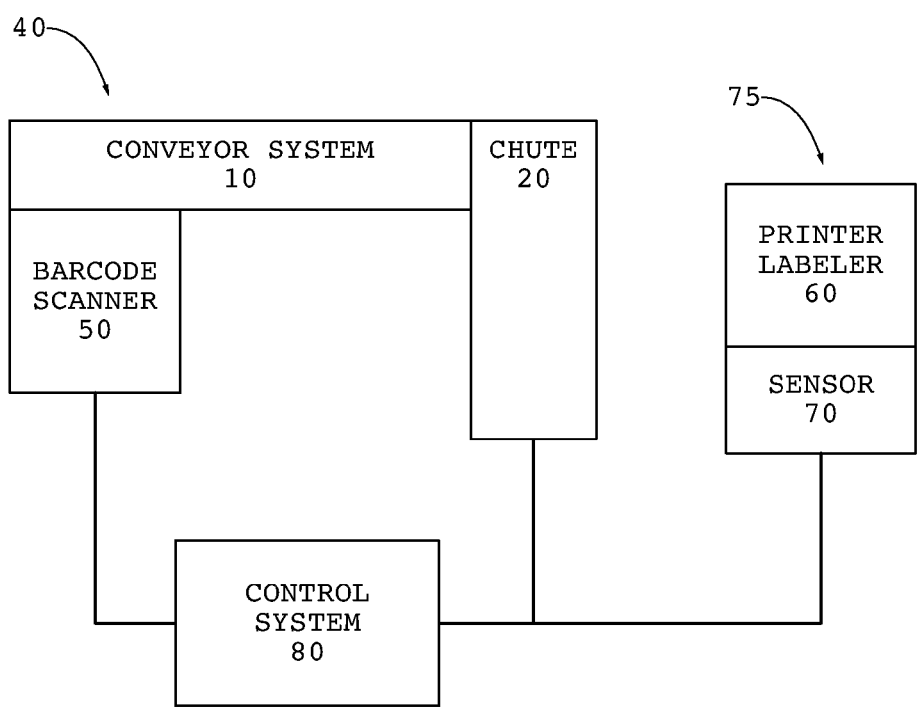
FIG. 2 is a block diagram of one embodiment of the delivery system of the present invention.

FIG. 2 illustrates one embodiment of the delivery system 40 of the present invention. In the preferred embodiment, as the product is riding along the conveyor system towards the delivery chute, the product is scanned (preferably via a barcode reader 50 place on the conveyor system). The details of the product scanned (for example, order number, order contents, packaging and/or delivery instructions) are then stored in the system and preferably transmitted to a control system 80 and a processing station 75 where the chute is located. The processing system preferably includes a printer or labeler 60 for printing out documents associated with the product being delivered on the conveyor system. For example, because the product has been scanned as it travels along the conveyor system, the processing station knows that the product is about to arrive at the chute delivery location and that associated paperwork (e.g., prescription information and instructions, and delivery information) can be printed out for placement into the delivery bag or box located at the bottom of the chute.

In one embodiment, there is a sensor 70 (e.g., infrared) located at the printer location that senses when the paper documents associated with the product order has been picked up for placement into the delivery bag or box. Upon sensing this occurrence, the system is programmed to release the product (e.g., vial order) so that it may be delivered by the chute to the delivery bag or box located at the bottom of the chute. Once the product, and associated documentation, has been placed into the delivery bag or box, the worker at the location can manually seal the package for delivery to the intended customer. The system then knows that this delivery order has been completed and updates the system.

An exemplary embodiment of a delivery system may further include a packing system adapted to receive a product from chute 20. Accordingly, an exemplary embodiment of the packing system may comprise the aforementioned package, which is adapted to receive product from chute 20. An exemplary embodiment of a packing system may also be adapted to communicate with conveyor 10 and/or chute 20.

As a result of the chute in association with the conveyor, greater automation of a delivery and packing process may be achieved. In one exemplary embodiment, conveyor 10 may be connected to chute 20 such that chute 20 is adapted to automatically deliver the product to the package or packing system. Other exemplary embodiments may offer greater automation as compared to a typical packing operation that requires an operator to manually pick a product from the conveyor and place it in a package.

In an exemplary embodiment, conveyor 10 is adapted to group a predetermined number of the product at a predetermined location until the predetermined number of the product are ready to be released to the chute 20. For example, a plurality of the product may be grouped at a predetermined location until a signal is received to release the group to chute 20. However, in some embodiments, a conveyor may be adapted to sequentially deliver a single product to the chute.

In an exemplary embodiment, conveyor 10 is adapted to receive at least one signal from the control system, which indicates that the predetermined number of the product are ready to be released to chute 20. In one example, the control system may be adapted to send a signal to conveyor 10 when the delivery bag or box is in place to receive the product and the operator has placed that associated order paperwork in the package. In such example, the control system may automatically send the signal to conveyor 10 when the delivery bag or box is ready. Alternatively, an operator may initiate the sending of the signal by the control system to the conveyor 10 when the delivery bag or box is ready to receive the product.

After conveyor 10 delivers the product to chute 20, an example of chute 20 may be adapted to transfer the product (e.g., the aforementioned predetermined number of the product or a single product) to a position above an opening of the delivery bag or box. From this position, each product may be automatically or manually scanned before being added to the delivery bag or box. The product may be released to the delivery bag or box singly or as a group. An example of chute 20 may include scanning capability, or an example of the system may include an automatic or manual system for scanning product released from the chute. Thereafter, in an exemplary embodiment, an operator may initiate sealing or closing of the delivery bag or box once the necessary product has been placed therein. In an alternative embodiment, the packing system may automatically seal or close the delivery bag or box once full.

In other exemplary embodiments, the chute may be adapted to deliver the product to the delivery bag or box without stopping the product. In such an embodiment, the product may be automatically or manually scanned before entering the chute, or the product may be automatically scanned while traveling through the chute.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A delivery system comprising:
   a conveyor adapted to convey a product;
   a chute associated with said conveyor such that said chute is adapted to receive said product from said conveyor;
   wherein said chute is adapted to deliver said product to a delivery container;
   a scanner located on the conveyor for scanning the product as it passes on the conveyor;
   a control system for communicating with said scanner for obtaining information about the product;
   a printer;
   a release mechanism located at the opening of the chute for holding the product at the opening until the system is ready to release the product into the chute for delivery;
   a processing system in communication with the control system and the printer, the processing system programmed with one or more software routines executing on the processing system to: 1) receive product information about the product; 2) instruct the printer to print out documents having product information about the product; 3) instruct the delivery system to release the product into the chute for delivery; and 4) update the delivery system when the product has been released for delivery;
   a sensor located near the printer to detect when the documents from the printer have been retrieved from the printer for placement into the delivery container;
   wherein the processing system programmed with one or more software routines executing on the processing system to instruct the delivery system to release the product into the chute for delivery when the sensor detects when the documents from the printer have been retrieved from the printer.

2. The delivery system of claim 1 wherein the product is a pharmacy bottle.

3. The delivery system of claim 1 wherein said chute is adapted to automatically deliver said product to said delivery container.

4. The delivery system of claim 1 wherein said conveyor is adapted to group a predetermined number of said product at a predetermined location until said predetermined number of said product are ready to be released to said chute.

5. The delivery system of claim 4 wherein said delivery system is adapted to receive at least one signal from the control system indicating that said predetermined number of said product are ready to be released to said chute.

6. The delivery system of claim 4 wherein said chute is adapted to transfer said predetermined number of said product to a position above an opening of said delivery container.

7. The delivery system of claim 6 wherein said chute is adapted to release said predetermined number of said product into said delivery container.

8. A delivery system comprising:
   a conveyor adapted to convey a product;
   a chute associated with said conveyor such that said chute is adapted to receive said product from said conveyor;
   a release mechanism located at the opening of the chute for holding the product at the opening until the system is ready to release the product into the chute for delivery;
   wherein said chute is adapted to deliver said product to a delivery container;
   a scanner located on the conveyor for scanning the product as it passes on the conveyor;
   a control system for communicating with said scanner for obtaining information about the product;
   a printer;
   a processing system in communication with the control system and the printer, the processing system programmed with one or more software routines executing on the processing system to: 1) receive product information about the product; 2) instruct the printer to print out documents having product information about the product; 3) instruct the delivery system to release the product into the chute for delivery; and 4) update the delivery system when the product has been released for delivery;

a sensor located near the printer to detect when the documents from the printer have been retrieved from the printer for placement into the delivery container;

wherein the processing system programmed with one or more software routines executing on the processing system to instruct the delivery system to release the product into the chute for delivery when the sensor detects when the documents from the printer have been retrieved from the printer.

9. A delivery system comprising:

a conveyor adapted to convey a product;

a chute associated with said conveyor such that said chute is adapted to receive said product from said conveyor;

a release mechanism located at the opening of the chute for holding the product at the opening until the system is ready to release the product into the chute for delivery;

wherein said chute is adapted to deliver said product to a delivery container;

a scanner located on the conveyor for scanning the product as it passes on the conveyor;

a control system for communicating with said scanner for obtaining information about the product;

a printer;

a sensor located near the printer to detect when the documents from the printer have been retrieved from the printer for placement into the delivery container;

a processing system in communication with the control system and the printer, the processing system programmed with one or more software routines executing on the processing system to: 1) receive product information about the product; 2) instruct the printer to print out documents having product information about the product; 3) instruct the delivery system to release the product into the chute for delivery when the sensor detects when the documents from the printer have been retrieved from the printer; and 4) update the delivery system when the product has been released for delivery.

\* \* \* \* \*